June 23, 1970 B. J. SKAGGS 3,516,525
VEHICLE POWER TAKE-OFF AND BRAKE CONTROL
Filed March 13, 1969
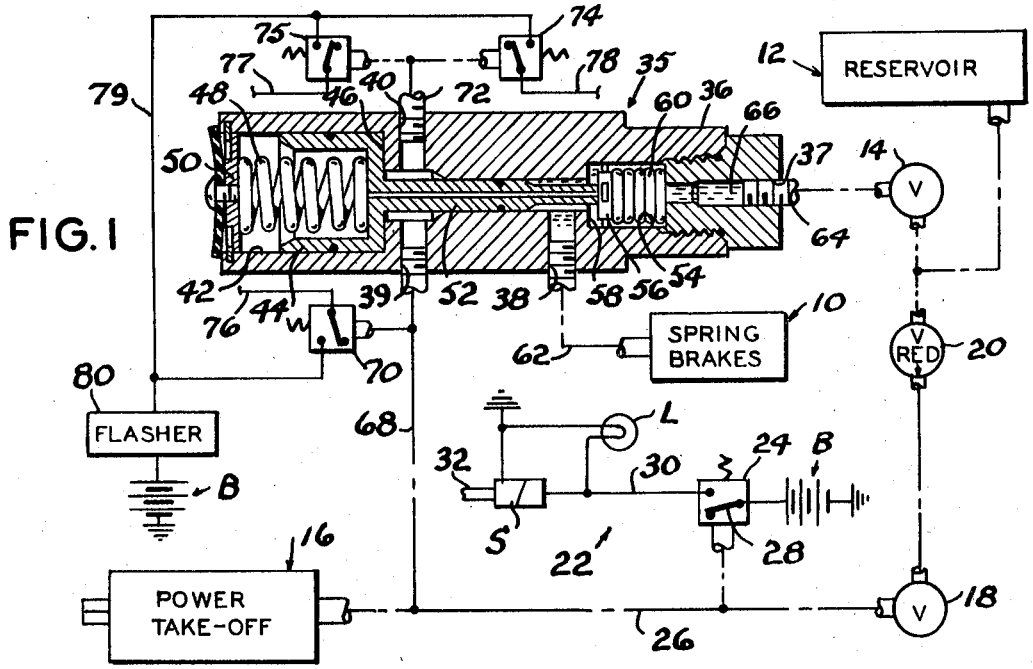
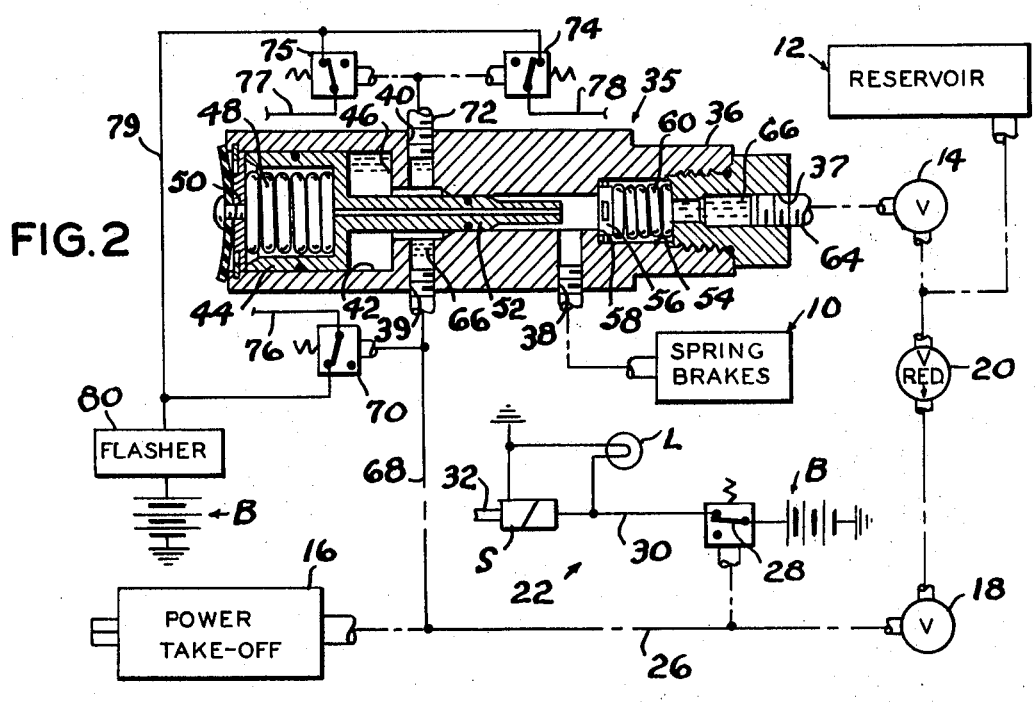
BILLY J. SKAGGS
INVENTOR.
BY
Robert K. Rhea
AGENT United States Patent Office 3,516,525
Patented June 23, 1970

3,516,525
VEHICLE POWER TAKE-OFF AND BRAKE CONTROL
Billy J. Skaggs, 2600 SW. 70,
Oklahoma City, Okla. 73159
Filed Mar. 13, 1969, Ser. No. 806,802
Int. Cl. F16h 57/10
U.S. Cl. 192—4                    4 Claims

ABSTRACT OF THE DISCLOSURE

In a vehicle having an air pressure reservoir connected with spring brakes and a power take-off unit through control valves, a pressure and spring operated two position valve device is interposed in the spring brake air conduit and connected with the power take-off air conduit. The valve device prevents release of the spring brakes when the power take-off unit is in operation and simultaneously flashes vehicle front and rear warning lamps.

BACKGROUND OF THE INVENTION

The present invention relates to spring brake equipped vehicles having a power take-off and more particularly to control means preventing release of vehicle parking brakes while the power take-off unit is in operation.

Field of the invention

Service trucks, such as garbage disposal units, are usually provided with pressure and spring operated brakes which are actuated to park the vehicle during the time that an engine driven power take-off unit is in operation for compacting trash or garbage. Inexperienced operators frequently neglect to disengage the power take-off unit when moving from one location to another which results in damage to the power take-off unit and vehicle transmission frequently requiring its replacement which is relatively expensive.

This invention provides a two position valve device which is interposed in the spring brake air pressure conduit and is connected with the power take-off air conduit which maintains the spring brakes in wheel and drum locked position until the power take-off unit is disengaged or released.

Description of the prior art

The prior art, such as Pat. No. 2,826,390; 2,759,569; 3,298,471 and 3,386,777, disclose a like number of valve means for maintaining hydraulic vehicle brakes in a locked position but none of these devices disclose a dual function of a brake locked position in combination with the power take-off drive wherein the power take-off must be released to unlock the brake setting mechanism.

SUMMARY OF THE INVENTION

Stated briefly, the invention comprises interposing a spring and air pressure operated valve device in the air pressure conduit between the spring brakes and their control valve and connecting the valve device to the power take-off air pressure conduit between the power take-off unit and its control valve. In a first position the valve device permits normal operation of the spring brakes. After the brakes have been "set" and the power take-off engaged, a second position of the valve device prevents release of the vehicle spring brakes until the power take-off unit is disengaged from the vehicle transmission. The valve device, in its second position, simultaneously closes air pressure switches for energizing vehicle hazard warning lamps.

The principal object of this invention is to provide a means for maintaining spring and pressure operated vehicle parking brakes in a locked position during the time a power take-off unit is in operation.

BRIEF DESCRIPTION OF THE DRAWINGS

FIG. 1 is a diagram of the connected components illustrating, in longitudinal cross section, the two position valve device in its first spring brake and power take-off released position; and, FIG. 2 is a diagrammatic view of the connected components illustrating, in longitudinal cross section, the valve device in its second spring brake setting and power take-off operating position.

DESCRIPTION OF THE PREFERRED EMBODIMENT

Like characters of reference designate like parts in those figures of the drawings in which they occur.

In the drawings:

Spring parking brake system

The reference numeral 10 indicates a pair of conventional spring brakes, only one being shown, installed on the rear wheels of a vehicle, not shown. These spring brakes comprise a special chamber, and, is actually two brakes in one, containing the usual diaphragm, push rod, pressure plate, return spring, an extra heavy duty spring and air piston. The spring brakes are connected with a reservoir 12 containing air under pressure supplied from an air pump, not shown, on the vehicle through a "push-pull" type air brake control valve 14. The diaphragm end of the dual brake chamber constitutes the service brake and the heavy duty spring constitutes the emergency and the parking brake means. A push rod shaft, for both of these forces, is attached to the vehicle brake slack adjustor. When the diaphragm is not under air pressure, the heavy duty spring expands, thus moving the slack adjustor and placing the brake shoes in contact with the brake drum which locks the parking brakes and prevents moving the vehicle until the brakes are released. This is accomplished by applying air pressure to the piston for compressing the heavy duty spring which releases the parking brakes. In the event of air pressure failure, the heavy duty springs extend and applies the brakes. These brakes are normally controlled by the spring brake control valve 14 normally mounted on the vehicle dash, not shown. Air pressure from the reservoir 12 is maintained on the inlet port of the valve 14. When the valve 14 is actuated, air is applied to the piston in the spring brake chambers thus compressing the heavy duty spring and releasing the parking brakes. The spring brake system further includes a quick release valve, not shown, positioned adjacent the brakes for exhausting air pressure from the spring brakes thus reducing the time delay of a remote air pressure release.

Air shift power take-off

The reference numeral 16 indicates a conventional power take-off mechanism which is connected with the reservoir 12 through a power take-off control valve 18 and a pressure reducing valve 20. The inlet port of the power take-off control valve 18 is supplied with constant air pressure from the reducing valve 20. When the power take-off valve 18 is actuated, air is applied to an air cylinder within the power take-off assembly which moves a fork in turn engaging the power take-off gear with a vehicle transmission gear, not shown. When the power take-off control valve 18 is disengaged, air pressure applied to the power take-off cylinder is exhausted through an exhaust port in the valve 18, not shown, thus releasing the spring loaded power take-off fork and disengaging the power take-off gear from the transmission.

Throttle solenoid circuit

The reference numeral 22 indicates a throttle solenoid circuit comprising a normally open pressure switch 24 connected in series with an air pressure conduit 26 connecting the power take-off 16 to its control valve 18. The armature 28 of the pressure switch is connected with a battery B and one terminal of the pressure switch is connected to a solenoid S by a wire 30. The solenoid is connected with the vehicle engine throttle by a rod 32 so that when the pressure switch 24 is closed by air pressure applied to the power take-off 16, the solenoid S advances the vehicle throttle to increase engine speed a desired number of revolutions per minute. A dash mounted pilot lamp, connected with the wire 30 and to common ground, indicates when the solenoid is energized. The solenoid S is normally connected with the wire 30 through a toggle switch and microswitch in series, neither of which are shown. The toggle switch is normally mounted on the vehicle dash and maintained open when the vehicle is in motion thus preventing accidental actuation of the solenoid while the microswitch is normally mounted on the vehicle body at a position adjacent the power take-off control valve 18 so that the microswitch may be closed at the time the power take-off unit is engaged.

Valve assembly

An inversion valve assembly 35 is interposed in the air conduit between the reservoir 12 and spring brakes 10 and is further connected with the power take-off conduit 26. The inversion valve assembly 35 is conventional, comprising a centrally bored and counterbored, from each end, housing 36 having four ports numbered 37, 38, 39 and 40. One counterbored end portion 42 of the housing coaxially receives a hollow piston 44 normally urged toward its seat 46 by a pair of concentric springs 48, only one being shown, maintained within the counterbore 42 by a cap 50. A centrally bored piston rod 52, coaxially connected with the piston 44, projects coaxially through the central bore of the housing 36. The other counterbored end portion 54 of the housing 36 coaxially receives a disk-like air valve 56 normally urged toward its seat 58 by a spring 60. The length of the piston rod 52 is slightly greater than the distance between the piston seat 46 and air valve seat 58 for the purposes readily apparent. The housing ports 37 and 38 communicate with the counterbore 54 and the ports 39 and 40 communicate with the counterbore 42.

The housing port 38 is connected to an existing air conduit 62, connected with the spring brakes 10. A new air conduit 64 connects the housing port 37 to the outlet port of the spring brake control valve 14.

As shown in FIG. 1, the piston spring 48 normally maintains the piston 44 seated so that the opposite end of the piston rod 52 contacts the air valve 56 to unseat the latter by overcoming the force of the spring 60 so that air pressure, indicated by the fluid lines 66, from the reservoir 12 when the spring brake valve 14 is opened, is applied to the spring brakes to maintain them released.

The housing port 39 is connected to the power take-off air conduit 26 by a conduit 68. A normally open pressure switch 70 is connected to the air conduit 68 intermediate its ends.

The housing port 40 is connected by conduits 72 to a pair of normally open pressure switches 74 and 75. The armature of each of the pressure switches 70 and 75 is connected to the vehicle right front and left signal lamps, not shown, by wires 76 and 77, respectively. The armature of the pressure switch 74 is connected to the vehicle stop lamps, not shown, by a wire 78. One terminal of each of the pressure switches 70, 74 and 75 are interconnected by wiring 79 connected to a conventional flasher 80 in turn connected with a source of electrical energy such as the battery B.

OPERATION

FIG. 1 illustrates the components in normal position for movement of the vehicle wherein air pressure, from the reservoir 12, passing through the brake control valve 14 and housing 36, through the conduits 62 and 64, normally maintains pressure against the spring brakes so that the emergency brakes are released. The housing, by its ports 37 and 38, when the air valve 56 is unseated, normally forms an unrestricted L in the spring brake air supply conduits 62 and 64. In this position the power take-off valve 18 is closed and no pressure is in the conduits 26 and 28, therefore, the springs of the pressure switches 24, 70, 74 and 75 maintain the armature of the respective switch in open position. When the vehicle is stopped and it is desired to use the power take-off 16, the power take-off control valve 18 is opened to admit air pressure to the conduit 26 for engaging the power take-off unit with the vehicle transmission while simultaneously air pressure in the conduit 68 overcomes the force of the piston springs 48, unseating the piston 44 and permitting the spring 60 to seat the air valve 56. Some of the air under pressure thus trapped between the housing port 38 and spring brake quick release valve is then bled off through the central bore of the piston 52 (FIG. 2). This reduction of air pressure in the conduit 62 permits the spring brake quick release valve to exhaust the conduit 62 so that no air pressure is applied to the spring brakes to insure spring locking position of the parking brakes. Simultaneously with this action air pressure in the conduit 26 closes the pressure switch 24 energizing the solenoid S to increase the revolutions per minute of the vehicle engine to its predetermined setting. Also, air pressure in the conduit 68 closes the pressure switches 70, 74 and 75 to complete a circuit for flashing the vehicle hazard warning lamps.

When the power take-off operation is completed and it is desired to move the vehicle, pressure must again be applied to the spring brakes to effect their release. This can only be accomplished by closing the power take-off control valve 18 so that the air conduits 26 and 28 are exhausted through the valve 18 which permits the piston springs 48 to again seat the piston 44, opening the pressure switches 24, 70, 74 and 75, interrupting the respective electrical circuits while the piston 52 unseats the air valve 56. Air pressure is then applied to the spring brakes 10, as described hereinabove, to effect the release of the parking brakes.

Obviously the invention is susceptible to changes or alterations without defeating its practicability, therefore, I do not wish to be confined to the preferred embodiment shown in the drawings and described herein.

I claim:

1. In combination with a vehicle having a throttle controlled engine and having a power take-off unit and pressure released spring operated brakes both connected, respectively, by conduits with a pressure reservoir through a power take-off control valve and a brake control valve, the improvement comprising:
   a valve device having a housing interposed in the spring brake conduit,
   said valve device having a first position permitting pressure communication between said reservoir and said spring brakes and a second position interrupting pressure communication between said reservoir and said spring brakes in response to pressure communication between said reservoir and said power take-off unit.

2. Structure as specified in claim 1 in which said valve device further includes,
   a spring urged piston normally maintaining said valve device in said first position, said spring urged piston being moved toward and maintained in said second position by pressure applied to said power take-off unit.

3. Structure as specified in claim 2 and further including,
    a normally open first pressure switch connected with said power take-off conduit and a source of electrical energy, and
    wire and solenoid means connecting said first pressure switch with the engine throttle for advancing the latter when said first pressure switch is closed.

4. Structure as specified in claim 3 and further including,
    other pressure switches connected with said power take-off conduit,
    said vehicle having hazard warning lamps, said other pressure switches each having a contact, and
    wiring connecting a source of electrical energy with said other pressure switches and said warning lamps for exciting the latter when said other pressure switches are closed.

References Cited
UNITED STATES PATENTS

| | | |
|---|---|---|
| 2,140,780 | 12/1938 | Wimmer. |
| 3,136,399 | 6/1964 | Granryd. |
| 3,332,298 | 7/1967 | Smith _____ 192—4 XR |

BENJAMIN W. WYCHE, III, Primary Examiner

U.S. Cl. X.R.

74—11; 137—627.5; 188—1, 170; 192—.094, 3, 13